March 12, 1974     L. A. ADAMS     3,796,789
REMOVAL OF IRON FROM SODIUM ALUMINATE LIQUOR
Original Filed April 23, 1969     2 Sheets-Sheet 1
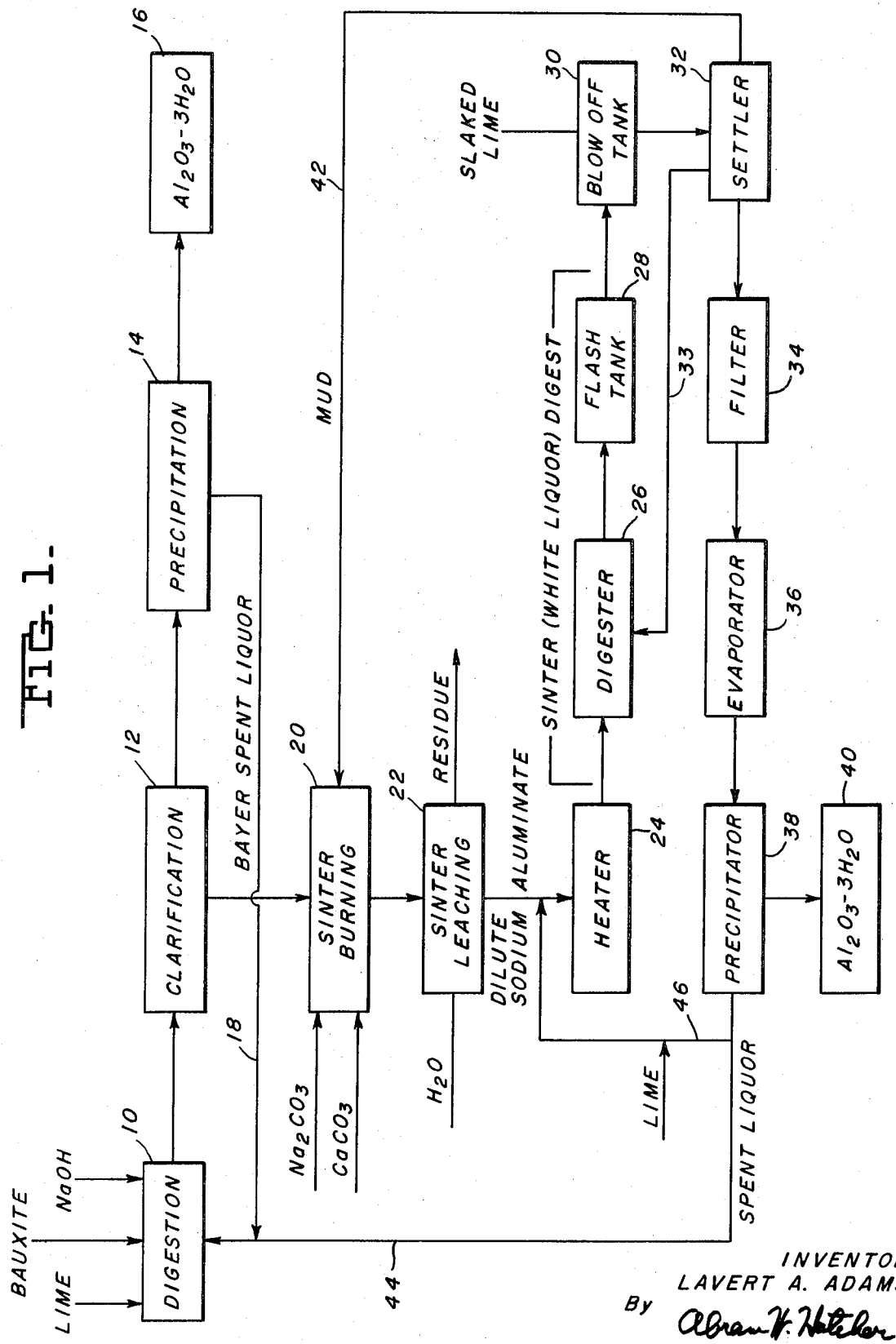
INVENTOR.
LAVERT A. ADAMS
By
Attorney

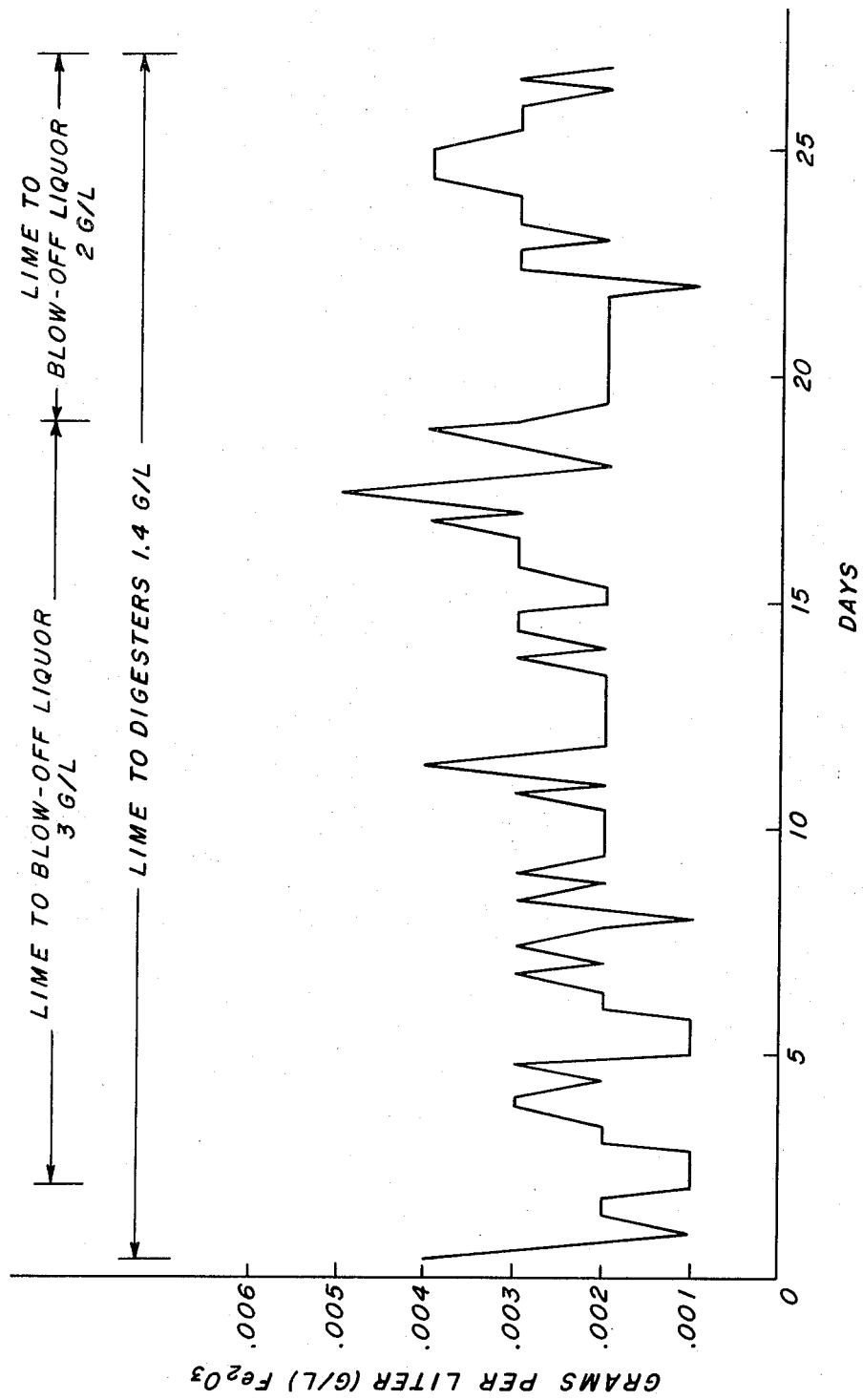

United States Patent Office 3,796,789
Patented Mar. 12, 1974

3,796,789
REMOVAL OF IRON FROM SODIUM
ALUMINATE LIQUOR
Lavert A. Adams, Benton, Ark., assignor to Aluminum
Company of America, Pittsburgh, Pa.
Continuation of abandoned application Ser. No. 818,653,
Apr. 23, 1969. This application Apr. 7, 1972, Ser.
No. 242,204
Int. Cl. C01f 7/00, 7/02
U.S. Cl. 423—122                                5 Claims

ABSTRACT OF THE DISCLOSURE

Lowering iron content by addition of slaked lime to the blow-off liquor resulting from digestion of the solution formed by leaching a soda-lime sinter product from an alumina source.

---

This is a continuation of application Ser. No. 818,653, filed Apr. 23, 1969 and now abandoned.

BACKGROUND OF THE INVENTION

This invention relates to the removal of iron from sodium aluminate liquor. More particularly, it relates to a method for reducing the iron content of sodium aluminate liquor resulting from leaching of a sinter product derived from an alumina source or ore.

In processing bauxite according to the conventional Bayer process, the clay fractions of bauxite react to form an insoluble sodium aluminum silicate compound. When processing bauxites with a quite high content of clay it has been found economical and efficient to process the bauxite residue (red mud) by a sinter process to recover most of the soda and aluminum values lost in the desilication product. In place of or along with the red mud may be used another low-alumina source such as clay. In this operation the bauxite residue or other alumina source is sintered with soda (for example, soda ash) and lime (for example, limestone or calcium carbonate) and the cooled sinter product is ground and leached with water. The sodium aluminate created in the sintering operation is dissolved to form a sinter leach liquor and separated from the residue, now called brown mud. The leach liquor may then either undergo separate high-temperature pressure digestion, or be returned to the ore leach liquor of the Bayer process resulting, from caustic digestion of an alumina source such as bauxite, for digestion therewith, for example as described in U.S. Pats. 2,375,342 and 2,375,343 (the teaching of which is incorporated herein by reference), for desilication.

During the sinter reaction a portion of the iron oxide content of the red mud reacts with sodium carbonate. When this reaction product is contacted by the leach solution, it hydrolyzes forming ferric and sodium hydroxides. Some of the ferric hydroxide is colloidal or nearly so and is therefore difficult to separate from the sinter leach liquor, even though the leach liquor is subsequently digested at a relatively high temperature for desilication, brought back to atmospheric pressure and then filtered prior to precipitation of the alumina hydrate.

The sinter leach liquor has a very high alumina: caustic ratio in the neighborhood of 0.9. The caustic value in this ratio is the sum of free sodium hydroxide present plus the sodium combined and sodium aluminate, both expressed as an $Na_2CO_3$ equivalent. At process temperatures sodium aluminate solutions with this high ratio are quite unstable and there is a strong tendency for an alumina scale to form in vessels or pipes to which the liquor passes. One way to reduce this scale formation is to inject a lime slaked in spent liquor (e.g., ratio about .3) into the sinter liquor as it heads for the digester. The liquor containing this lime goes through a heater to the digester where temperature and pressure are raised to accomplish the desilication of the sinter liquor. Solids from a settler which follows may also be put into the digester. These solids are primarily calcium aluminate solids formed during digestion and which may be recirculated to act as a scavenger for iron or other particulate matter. The iron and other particles are very fine, and therefore sometimes tend to create a problem in removal from the liquor stream prior to precipitation of the alumina hydrate. By iron herein I mean iron in any form in which it may be present, for example, as $Fe_2O_3$, iron oxide hydrate or other compound form, or whether in dissolved, colloidal or solids larger than colloidal form.

There is a general correlation between the lime required to obtain acceptable iron level and the mud remaining in the sinter liquor as it comes from filtration. For example, when the mud level in sinter liquor reaches approximately 0.9 g./l., 6 g./l. of lime added to the liquor prior to digestion may still not be sufficient to give the desired iron removal and prevent the aforementioned scaling if there is anything less than a maximum return of settler underflow solids to the digester. On the other hand, there are times when the mud level may be sufficiently low for a lime addition of 2 g./l. to be sufficient.

In planning the most efficient operation, the stoichiometric amounts of calcium carbonate (lime) and sodium carbonate (soda) necessary to form the reaction products of dicalcium silicate and sodium aluminate are calculated, assuming that the purity of the sodium carbonate is 100% and that the purity of the limestone as calcium carbonate is approximately 98.5%. Experience has shown, however, that additional sodium carbonate must be charged for the iron and titanium present in the raw mud feed since in sintering there are reaction products formed in which sodium is tied up with iron and titanium. Thus, if additional sodium carbonate is not charged, the competition among alumina, iron and titanium for the available sodium causes some alumina to be lost by being tied up as desilication product. Because the iron and titanium levels in the raw feed mud change very slowly and tend to stay within broad limits depending on bauxite composition, it is possible, instead of calculating the soda ash requirement specifically for iron and titanium, to add an override on the charge calculated for alumina. Such a surcharge brings the figures for theoretical soda to the 120% region. A similar surcharge can be used for the limestone requirement since some calcium compounds are formed with titanium and, the purity of the limestone varies, and the limestone may contain differing amounts of moisture. Despite such a use of surcharges in calculating the optimum amounts of lime and soda to be used in sintering, however, there is still a combination of theoretical calcium and theoretical sodium which sometimes creates a fine mud so difficult to filter that the mud level may go as high as 3 g./l. and make almost intolerable demands on the digestion process for removal of iron and other impurities.

Along with these physical problems associated with the theoretical sodium and calcium levels is the problem of how to recover a reasonable amount of alumina values from the feed mud. Thus, the composition of sinter which tends to yield low mud levels and therefore low iron levels in the sinter liquor is also a poor one from the alumina recovery standpoint. Furthermore, when mud level is high and alumina recovery often easier, it is difficult by known addition of lime at the sinter filtrate stage or even during digestion to keep the iron level down. Therefore, development of a process which can be tailored so as to recover a maximum alumina value while at the same time keeping the iron level at a reasonable value represents a highly desirable result.

SUMMARY OF THE INVENTION

It is accordingly an object of this invention to provide an improved method for removal of iron from sodium aluminate liquor. Another object is to provide a method for lowering the iron content of sodium aluminate liquor resulting from sintering and leaching an alumina-bearing source material without substantially lessening the efficiency of production of alumina hydrate. Further objects will be apparent from the description and claims which follow.

In its broader aspects my invention involves adding slaked lime to the sodium aluminate sinter leach liquor being brought back from high-temperature, high-pressure digest conditions to conditions approximating adiabatic or room temperature-atmospheric pressure conditions, preferably, by adding slaked lime to what I will designate as the blow-off liquor, which will be referred to further hereinafter. According to my invention the lime may be slaked either by water or by spent liquor recycled from an alumina hydrate precipitator in which the hydrate is conventionally precipitated either by seeding or by carbon dioxide addition. The process of this invention enables close control of the amounts of lime and soda used for sintering. According to one embodiment, in addition to the slaked lime added to blow-off liquor, slaked lime is also added prior to the blow-off step, for example, to the sinter leach liquor. The process of the invention permits keeping the iron level low while at the same time recovering a maximum alumina value. I have had best results by adding 0.5 to 4 g./l. of slaked lime to the blow-off liquor. When lime is added also prior to digestion, the amount preferred is at least 1 g./l. According to my invention the stoichiometric amount of soda in the sinter mix may be tailored to 115–130% of theoretical and the stoichiometric amount of lime to 101–115% of theoretical.

By adding slaked lime to blow-off liquor according to my invention it is possible to adjust sinter composition to an optimum amount of 127–128% of theoretical soda and an optimum amount of 110–120% of theoretical lime for most efficient recovery of alumina hydrate and best reduction of iron. By risking a thin hard filter cake and a high mud level in the liquor, even a slight further increase in alumina hydrate recovery is possible by pushing the theoretical soda up to 130%.

According to my invention I often lower the iron content of the purified sodium aluminate to 0.005 g./l. $Fe_2O_3$ or less, sometimes even to 0.003 g./l. or less. By my process, I have also been able to increase the alumina and soda extraction from sinter from an average of 81.1 and 83.8, respectively, to an average of 84.2 and 85.2%.

BRIEF DESCRIPTION OF THE DRAWING

For a better understanding of my invention and one manner in which it may be practiced, reference will now be made to the drawing, in which:

FIG. 1 is a schematic diagram in flow sheet form showing an illustrative embodiment of the improved process of the invention, including the lime addition to blow-off liquor.

FIG. 2 is a graph illustrating the amount of iron removal over one period of time during which the procedure of this invention was used.

DETAILED DESCRIPTION OF THE DRAWING

In FIG. 1, bauxite is digested according to the conventional Bayer process with lime and sodium hydroxide at 10 and the product clarified at 12 prior to precipitation at 14 of alumina trihydrate 16. Spent liquor is recycled via line 18 to digester 10. Red mud removed from clarifier 12 is sintered at 20 with soda ash (soda) and limestone (lime), the sinter product being leached with water or caustic at 22. The resulting leach liquor, with slaked lime added thereto, is conducted to a digestion stage consisting of heating at 24 in one or more heaters, and digesting the heated liquor under pressure at 26 prior to bringing back to atmospheric conditions via one or more flash tanks 28 and one or more blow-off tanks 30. Slaked lime, which may be provided by lime which has been slaked with water or by lime slaked with spent liquor recycled from the subsequent alumina hydrate precipitation tank (as may be the slaked lime supplied earlier to the sinter leach liquor), is added to the blow-off liquor at 30 and the resulting liquor conducted next via settler 32 (from which solids may be recirculated via line 33 to the digestion stage, for example, to digester 26), filter 34 and evaporator 36 to precipitator 38, where alumina trihydrate 40 is precipitated in a conventional manner, for example, by carbonation with addition of $CO_2$ or by seeding with alumina hydrate crystals. Mud may be recycled from settler 32 via line 42, for example, to the sinter burning stage 20 and spent liquor recycled via line 44 to digestion tank 10, a portion being recycled to the sinter digestion stage via line 46, if desired.

FIG. 2 illustrates addition of lime to blow-off liquor for removal of iron, using a step such as schematically depicted in FIG. 1. Over a period of about 30 days approximately 3 g./l. of lime slaked at approximately 150° F. and 20% solids were added to the suction of a third blow-off tank (such as depicted in FIG. 1) of a series of three. The lime (CaO) and soda ($Na_2O$) in the sinter mixture were respectively 103% and 119% of the theoretical stoichiometric amounts. A record was kept, and the $Fe_2O_3$ content (g./l.) of the purified sodium aluminate liquor measured by colorimetric determination was plotted against the time in days. Results are shown in said FIG. 2.

It is believed readily apparent from the foregoing description and examples that by my process of adding lime to blow-off liquor I have permitted tailoring of the content of lime and soda in a sinter mixture used for production of alumina hydrate to an extent that alumina recovery at the filtration stage is improved. I have also overcome the problems of loss of alumina to calcium and the inclusion of a substantial amount of iron fines in the liquor from which the alumina hydrate is precipitated encountered in prior art desilication. By my invention I have also achieved an improved reduction of iron level in the liquor from which the alumina hydrate product is precipitated with use of smaller amounts of lime than heretofore known for use only at the sinter leach liquor and digesting stages or earlier.

While the invention has been described in terms of preferred embodiments, the claims appended hereto are intended to encompass all embodiments which fall within the spirit of the invention.

Having thus described my invention and certain preferred embodiments thereof, I claim:

1. In a process for production of alumina hydrate from sodium aluminate liquor resulting from caustic leaching of an alumina-bearing source material comprising heating said liquor, digesting the heated liquor under pressure, then gradually bringing the liquor back to atmospheric pressure, separating solids therefrom and then precipitating alumina from the liquor remaining after said separating of solids, the improvement which comprises reducing the iron content of the liquor from which the alumina is precipitated by adding slaked lime to the liquor subsequent to the digesting and after bringing the liquor to substantially atmospheric conditions.

2. In a process for production of alumina hydrate from sodium aluminate liquor resulting from sintering and leaching an alumina-bearing source material with soda and lime comprising heating said liquor, digesting the heated liquor under pressure, then gradually bringing the liquor back to atmospheric pressure, separating solids therefrom and then precipitating alumina from the liquor remaining after said separating of solids, the improvement which comprises reducing the iron content of the liquor from which the alumina is precipitated by adding slaked lime to the liquor subsequent to the digesting and after bringing the liquor to substantially atmospheric conditions.

3. The improvement of claim 2 wherein the slaked lime added to the liquor subsequent to the digesting and prior to the separating of solids from the liquor amounts to from about 0.5 to about 4 grams per liter.

4. The improvement of claim 2 wherein additional slaked lime is added to the liquor prior to the digesting.

5. The improvement of claim 4 wherein the additional slaked lime added to the liquor prior to the digesting amounts to at least about 1 gram per liter.

References Cited

UNITED STATES PATENTS

| | | | |
|---|---|---|---|
| 1,422,004 | 7/1922 | Sherwin | 423—121 |
| 2,559,653 | 7/1951 | Mooney | 423—121 |
| 3,512,926 | 5/1970 | Mercier et al. | 423—123 |

OTHER REFERENCES

Edwards: "The Aluminum Industry," vol. I, 1st edition, pp. 157–161 (1930).

Chemical Engineering, vol. 61, pp. 112, 114, and 334–337 (November 1954).

OSCAR R. VERTIZ, Primary Examiner

H. S. MILLER, Assistant Examiner

U.S. Cl. X.R.

423—629